(12) United States Patent
Sanders et al.

(10) Patent No.: US 11,047,508 B2
(45) Date of Patent: Jun. 29, 2021

(54) VENT WITH RELIEF VALVE

(71) Applicant: DONALDSON COMPANY, INC., Minneapolis, MN (US)

(72) Inventors: Jacob Sanders, Burnsville, MN (US); Michael J. Hebert, St. Paul, MN (US); Daniel Dotzler, Webster, MN (US); Koen Gatz, Hasselt (BE)

(73) Assignee: Donaldson Company, Inc., Minneapolis, MN (US)

( * ) Notice: Subject to any disclaimer, the term of this patent is extended or adjusted under 35 U.S.C. 154(b) by 62 days.

(21) Appl. No.: 16/497,596

(22) PCT Filed: Mar. 30, 2018

(86) PCT No.: PCT/US2018/025346
§ 371 (c)(1),
(2) Date: Sep. 25, 2019

(87) PCT Pub. No.: WO2018/183804
PCT Pub. Date: Oct. 4, 2018

(65) Prior Publication Data
US 2020/0032924 A1    Jan. 30, 2020

Related U.S. Application Data

(60) Provisional application No. 62/478,872, filed on Mar. 30, 2017.

(51) Int. Cl.
*F16K 15/14* (2006.01)
*F16K 47/08* (2006.01)
*F16K 24/04* (2006.01)

(52) U.S. Cl.
CPC ............ *F16K 47/08* (2013.01); *F16K 15/148* (2013.01); *F16K 24/04* (2013.01); *Y10T 137/7849* (2015.04)

(58) Field of Classification Search
CPC ............ F16K 15/148; Y10T 137/7839; Y10T 137/784; Y10T 137/786; Y10T 137/7874; Y10T 137/7849; Y10T 137/789
See application file for complete search history.

(56) References Cited

U.S. PATENT DOCUMENTS 82,670 A * 9/1868 Wilson et al. ........ F16K 15/038
137/512.1
1,707,306 A * 4/1929 Holdsworth ............ F16K 15/12
137/512.1
(Continued)

FOREIGN PATENT DOCUMENTS

CN        1596269 B2    7/1975
CN      101142698 A    3/2008
(Continued)

OTHER PUBLICATIONS

International Patent Application No. PCT/US2018/025346, filed Mar. 30, 2018, International Preliminary Report on Patentability dated Oct. 1, 2019, 5 pages.
(Continued)

*Primary Examiner* — Robert K Arundale
(74) *Attorney, Agent, or Firm* — Mueting Raasch Group

(57) ABSTRACT

A vent assembly has a housing defining a cavity, a first end, a second end, and a coupling structure towards the second end. A mounting surface is positioned between the first end and the second end within the cavity and defines a valve opening and a vent opening. A vent is coupled to the mounting surface across the vent opening, and an umbrella valve is sealably disposed on the mounting surface across a valve opening.

14 Claims, 8 Drawing Sheets

(56) References Cited

U.S. PATENT DOCUMENTS

| | | | |
|---|---|---|---|
| 2,725,075 A * | 11/1955 | Irgens | F02D 9/18 |
| | | | 137/512.1 |
| 3,143,441 A | 8/1964 | Coleman et al. | |
| 3,519,012 A * | 7/1970 | Van Patten | A62B 18/10 |
| | | | 137/102 |
| 3,524,112 A | 8/1970 | Ruttkay et al. | |
| 3,981,636 A * | 9/1976 | Aoki | F04B 45/04 |
| | | | 417/566 |
| 3,994,749 A | 11/1976 | Decker et al. | |
| 4,008,354 A | 2/1977 | Fitchman et al. | |
| 4,296,186 A | 10/1981 | Wolf | |
| 4,307,158 A | 12/1981 | Thibault | |
| 4,447,508 A | 5/1984 | Jensen | |
| 4,512,243 A | 4/1985 | Ballard et al. | |
| 4,537,841 A | 8/1985 | Wiacek et al. | |
| 4,939,050 A | 7/1990 | Toyosawa et al. | |
| 5,045,085 A | 9/1991 | Binder et al. | |
| 5,258,242 A | 11/1993 | Dean et al. | |
| 5,486,429 A | 1/1996 | Thibault | |
| 5,507,318 A * | 4/1996 | Israelson | F04B 53/1065 |
| | | | 137/854 |
| 5,660,944 A | 8/1997 | Sprengel et al. | |
| 5,752,746 A | 5/1998 | Perry | |
| 5,795,674 A | 8/1998 | Shiota | |
| 5,821,008 A | 10/1998 | Harada et al. | |
| 5,860,708 A | 1/1999 | Borders et al. | |
| 6,068,944 A | 5/2000 | Witzigreuter | |
| 6,110,617 A | 8/2000 | Feres | |
| 6,168,877 B1 | 1/2001 | Pedicini et al. | |
| 6,190,792 B1 | 2/2001 | Faris et al. | |
| 6,218,034 B1 | 4/2001 | Faris et al. | |
| 6,228,519 B1 | 5/2001 | Faris et al. | |
| 6,239,508 B1 | 5/2001 | Faris et al. | |
| 6,248,464 B1 | 6/2001 | Pedicini et al. | |
| 6,287,715 B1 | 9/2001 | Faris et al. | |
| 6,296,960 B1 | 10/2001 | Faris et al. | |
| 6,299,997 B1 | 10/2001 | Faris et al. | |
| 6,299,998 B1 | 10/2001 | Morris et al. | |
| 6,306,534 B1 | 10/2001 | Faris et al. | |
| 6,309,771 B1 | 10/2001 | Faris et al. | |
| 6,312,844 B1 | 11/2001 | Faris | |
| 6,335,111 B1 | 1/2002 | Faris et al. | |
| 6,348,277 B1 | 2/2002 | Faris et al. | |
| 6,355,372 B2 | 3/2002 | Yamahira et al. | |
| 6,361,294 B1 | 3/2002 | Witzigreuter et al. | |
| 6,365,292 B1 | 4/2002 | Faris et al. | |
| 6,376,119 B1 | 4/2002 | Nann et al. | |
| 6,383,673 B1 | 5/2002 | Faris et al. | |
| 6,386,673 B1 | 5/2002 | Takahashi et al. | |
| 6,403,244 B2 | 6/2002 | Faris et al. | |
| 6,410,174 B1 | 6/2002 | Faris | |
| 6,436,564 B1 | 8/2002 | Witzigreuter et al. | |
| 6,444,348 B1 | 9/2002 | Saijo et al. | |
| 6,451,463 B1 | 9/2002 | Tsai et al. | |
| 6,458,480 B1 | 10/2002 | Morris et al. | |
| 6,472,093 B2 | 10/2002 | Faris et al. | |
| 6,475,658 B1 | 11/2002 | Pedicini et al. | |
| 6,485,850 B1 | 11/2002 | Tsai et al. | |
| 6,544,678 B2 | 4/2003 | Faris et al. | |
| 6,558,825 B1 | 5/2003 | Faris et al. | |
| 6,558,828 B1 | 5/2003 | Guo et al. | |
| 6,558,829 B1 | 5/2003 | Faris et al. | |
| 6,558,830 B2 | 5/2003 | Faris et al. | |
| 6,562,494 B1 | 5/2003 | Tsai et al. | |
| 6,562,504 B2 | 5/2003 | Faris et al. | |
| 6,569,555 B1 | 5/2003 | Faris et al. | |
| 6,641,943 B1 | 11/2003 | Faris et al. | |
| 6,660,418 B1 | 12/2003 | Tinker et al. | |
| 6,759,159 B1 | 7/2004 | Gray et al. | |
| 6,794,069 B1 | 9/2004 | Faris et al. | |
| 6,824,915 B1 | 11/2004 | Pedicini | |
| 7,007,715 B2 | 3/2006 | Nakayama et al. | |
| 7,122,270 B2 | 10/2006 | Ray, Jr. et al. | |
| 7,226,676 B2 | 6/2007 | Faris et al. | |
| 7,332,238 B2 | 2/2008 | Motupally et al. | |
| 7,357,709 B2 | 4/2008 | Zukor et al. | |
| 7,378,180 B2 | 5/2008 | Causton et al. | |
| 7,799,109 B2 | 9/2010 | Dunsch et al. | |
| 7,991,174 B2 | 8/2011 | Huynh et al. | |
| 8,057,933 B2 | 11/2011 | Miyahisa et al. | |
| 8,069,875 B2 | 12/2011 | Mashiko | |
| 8,147,999 B2 | 4/2012 | Wu | |
| 8,525,055 B2 | 9/2013 | Brazier et al. | |
| 8,557,416 B2 | 10/2013 | Mardall et al. | |
| 8,697,268 B2 | 4/2014 | Choi et al. | |
| 8,980,455 B2 | 3/2015 | Guo | |
| 9,061,811 B2 | 6/2015 | Egersdoerfer et al. | |
| 9,105,902 B2 | 8/2015 | Tyler et al. | |
| 9,153,386 B2 | 10/2015 | Okada et al. | |
| 9,293,792 B2 | 3/2016 | Grace et al. | |
| 9,428,304 B2 | 8/2016 | Scagliarini et al. | |
| 9,685,645 B2 | 6/2017 | Janarthanam et al. | |
| 9,735,407 B2 | 8/2017 | Kusunoki et al. | |
| 10,403,944 B2 | 9/2019 | Obrist et al. | |
| 10,529,970 B2 | 1/2020 | Albukrek et al. | |
| 10,557,561 B2 | 2/2020 | Kleinke et al. | |
| 2003/0215698 A1 | 11/2003 | Schulte-Ladbeck | |
| 2004/0048145 A1 | 3/2004 | Causton et al. | |
| 2005/0227610 A1 | 10/2005 | Zukor et al. | |
| 2007/0003084 A1 | 1/2007 | Huynh et al. | |
| 2007/0222840 A1 | 9/2007 | Xiao et al. | |
| 2008/0155949 A1 | 7/2008 | Dunsch et al. | |
| 2008/0182159 A1 | 7/2008 | Mitani et al. | |
| 2008/0199763 A1 | 8/2008 | Ito et al. | |
| 2009/0081542 A1 | 3/2009 | Yageta et al. | |
| 2009/0120949 A1 | 5/2009 | Mashiko et al. | |
| 2009/0266815 A1 | 10/2009 | Lauk et al. | |
| 2010/0025614 A1 * | 2/2010 | Cai | F04B 43/025 |
| | | | 251/324 |
| 2010/0215996 A1 | 8/2010 | Wendling et al. | |
| 2010/0233520 A1 | 9/2010 | Suzuki et al. | |
| 2010/0233530 A1 | 9/2010 | Mao et al. | |
| 2011/0008654 A1 | 1/2011 | Kim et al. | |
| 2012/0000548 A1 | 1/2012 | Khamitkar | |
| 2012/0040215 A1 | 2/2012 | Zhu et al. | |
| 2012/0151754 A1 | 6/2012 | Wu | |
| 2012/0231306 A1 | 9/2012 | Herron et al. | |
| 2012/0263982 A1 | 10/2012 | Yasui et al. | |
| 2012/0282499 A1 | 11/2012 | Eichinger et al. | |
| 2012/0315514 A1 | 12/2012 | Guo | |
| 2013/0149568 A1 | 6/2013 | Zhang et al. | |
| 2013/0216871 A1 | 8/2013 | Lee et al. | |
| 2014/0053916 A1 | 2/2014 | Khamitkar | |
| 2014/0120387 A1 | 5/2014 | Kinuta et al. | |
| 2014/0141296 A1 | 5/2014 | Nakai | |
| 2014/0287282 A1 | 9/2014 | Beylich et al. | |
| 2015/0030893 A1 | 1/2015 | Mack et al. | |
| 2015/0034172 A1 | 2/2015 | Khamitkar | |
| 2015/0064515 A1 | 3/2015 | Brazier et al. | |
| 2015/0072184 A1 | 3/2015 | Kusunoki et al. | |
| 2015/0140368 A1 | 5/2015 | Hirakawa et al. | |
| 2015/0217417 A1 | 8/2015 | Takeshita | |
| 2015/0316158 A1 | 11/2015 | Winkler et al. | |
| 2015/0340673 A1 | 11/2015 | Joswig et al. | |
| 2015/0364734 A1 | 12/2015 | Kunoike et al. | |
| 2016/0036025 A1 | 2/2016 | Hofer | |
| 2016/0093857 A1 | 3/2016 | Dekeuster et al. | |
| 2016/0172644 A1 | 6/2016 | Goldman et al. | |
| 2016/0327171 A1 | 11/2016 | Seidl et al. | |
| 2016/0365553 A1 | 12/2016 | Kountz et al. | |
| 2017/0005319 A1 | 1/2017 | Rong | |
| 2017/0187018 A1 | 6/2017 | Pflueger et al. | |
| 2017/0279169 A1 | 9/2017 | Obrist et al. | |
| 2018/0062134 A1 | 3/2018 | Bauer | |
| 2018/0219200 A1 | 8/2018 | Albukrek et al. | |
| 2018/0292020 A1 | 10/2018 | Kleinke et al. | |

FOREIGN PATENT DOCUMENTS

| | | |
|---|---|---|
| CN | 201408794 Y | 2/2010 |
| CN | 1088280 B | 6/2010 |
| CN | 202042536 U | 11/2011 |
| CN | 101915229 B | 8/2012 |
| CN | 103531730 A | 1/2014 |

(56) References Cited

FOREIGN PATENT DOCUMENTS

| | | |
|---|---|---|
| CN | 103928646 A | 7/2014 |
| CN | 102280604 B | 11/2014 |
| CN | 104282850 A | 1/2015 |
| CN | 104425786 A | 3/2015 |
| CN | 104577001 A | 4/2015 |
| CN | 104956515 A | 9/2015 |
| CN | 205298645 | 6/2016 |
| CN | 103733378 B | 8/2016 |
| DE | 1195830 B | 7/1965 |
| DE | 3436415 A1 | 5/1985 |
| DE | 8534913 U1 | 3/1986 |
| DE | 9104291 U1 | 8/1991 |
| DE | 102008025422 A1 | 12/2009 |
| DE | 102009020185 A1 | 11/2010 |
| DE | 112011105182 T5 | 1/2014 |
| DE | 102012215058 A1 | 2/2014 |
| DE | 102011015925 B4 | 4/2014 |
| DE | 102012022346 A1 | 5/2014 |
| DE | 102013203037 A1 | 8/2014 |
| DE | 102013213909 A1 | 1/2015 |
| DE | 102013218911 A1 | 3/2015 |
| DE | 112013003696 T5 | 4/2015 |
| DE | 102013222630 A1 | 5/2015 |
| DE | 102015208777 A1 | 11/2016 |
| EP | 0 504 573 A1 | 9/1992 |
| EP | 0 554 535 A1 | 8/1993 |
| EP | 0 819 321 B1 | 7/1999 |
| EP | 0 887 872 B1 | 10/2005 |
| EP | 1 930 654 B1 | 7/2011 |
| EP | 2 533 346 A1 | 12/2012 |
| EP | 1 859 497 B1 | 9/2013 |
| EP | 2 780 962 B1 | 1/2017 |
| EP | 3 385 584 B1 | 9/2019 |
| FR | 2212019 A5 | 7/1974 |
| FR | 2 551 172 A1 | 3/1985 |
| FR | 2 969 394 A1 | 6/2012 |
| GB | 618332 A | 2/1949 |
| GB | 1165899 A | 10/1969 |
| GB | 2392774 A | 3/2004 |
| GB | 2392774 B | 10/2005 |
| JP | S59-134369 U | 9/1984 |
| JP | H08153496 A | 6/1996 |
| JP | H08153507 A | 6/1996 |
| JP | H08153508 A | 6/1996 |
| JP | H08-293294 A | 11/1996 |
| JP | H09-306469 A | 11/1997 |
| JP | H09-330689 A | 12/1997 |
| JP | H10-241652 A | 9/1998 |
| JP | 3222963 B2 | 10/2001 |
| JP | 2002-521805 A | 7/2002 |
| JP | 2008-34167 A | 2/2008 |
| JP | 2012069644 | 4/2012 |
| JP | 5613955 B2 | 10/2014 |
| JP | 2015170471 | 9/2015 |
| JP | 3208934 U | 2/2017 |
| JP | 6636078 B2 | 1/2020 |
| KR | 1020060086124 A | 7/2006 |
| KR | 1020070068849 A | 7/2007 |
| KR | 1020080036248 A | 4/2008 |
| KR | 1020100041472 A | 4/2010 |
| KR | 1020150034498 A | 4/2015 |
| WO | WO 96/08048 A1 | 3/1996 |
| WO | WO 96/31915 A1 | 10/1996 |
| WO | WO 99/48161 A1 | 9/1999 |
| WO | WO 00/07252 A1 | 2/2000 |
| WO | WO 00/72388 A1 | 11/2000 |
| WO | WO 2007/139880 A1 | 12/2007 |
| WO | WO 2010/0125226 A1 | 11/2010 |
| WO | WO 2011/131140 A1 | 10/2011 |
| WO | WO 2012/019371 A1 | 2/2012 |
| WO | WO 2012/050343 A2 | 4/2012 |
| WO | WO 2012/0125226 A1 | 9/2012 |
| WO | WO 2012/173588 A1 | 12/2012 |
| WO | WO 2013/121990 A1 | 8/2013 |
| WO | WO 2014/023511 A1 | 2/2014 |
| WO | WO 2015/180971 A1 | 12/2015 |
| WO | WO 2016/177687 A1 | 11/2016 |
| WO | WO 2017/017199 A1 | 2/2017 |
| WO | WO 2018/119242 A1 | 6/2018 |
| WO | WO 2020/085210 A1 | 4/2020 |

OTHER PUBLICATIONS

International Patent Application No. PCT/US2018/025346, filed Mar. 30, 2018, International Search Report and Written Opinion dated Jun. 21, 2018, 8 pages.
International Patent Application No. PCT/US2018/025346, filed Mar. 30, 2018, Third Party Observation, submitted Jul. 19, 2019, 116 pages.
Freudenberg Sealing Technologies, "Turning Two into One: Innovative Pressure Compensation for the Batteries of Electric Vehicles", Sep. 13, 2017, Freudenberg Sealing Technologies GmbH & Co. KG, Weinheim, Germany, 3 pages.
"Extend Seal & Bearing Life by Preventing Contamination", STEMCO Sentinel Technology, May 2014, STEMCO LP USA, Longview, Texas, 2 pages.

* cited by examiner

VENT WITH RELIEF VALVE

CONTINUING APPLICATION DATA

This application is the § 371 U.S. National Stage of International Application No. PCT/US2018/025346, filed Mar. 30, 2018, which claims the benefit of U.S. Provisional Application No. 62/478,872, filed Mar. 30, 2017, the disclosures of which are incorporated by reference herein in their entireties.

TECHNOLOGICAL FIELD

The current technology generally relates to a vent. More particularly the current technology relates to a vent with integrated relief valve functionality.

BACKGROUND

Protective vents are typically employed to allow pressure equalization between a casing and the environment outside of the casing. Vents can use a water, dust, and oil resistant membrane to allow gas pressures to equalize while preventing liquid and solid contaminants to pass through. However, in some technological areas, it is possible for the pressure inside of the casing to spike drastically, and the protective vent is insufficient to achieve equilibrium quickly enough to prevent damage to components in the casing, or the casing itself. For example, in a battery casing having multiple cells, if a single cell explodes, the resulting pressure in the battery casing can cause damage to the other cells in the casing, or cause the casing to burst under the high pressure

SUMMARY

The technology disclosed herein relates to a vent having a relief valve. In some examples, the vent is configured to passively allow gas to vent between a casing and the outside environment under normal operating conditions. However, upon a pressure spike inside the casing, a relief valve allows gas to bypass the vent. In some example implementations the technology disclosed herein is employed on the casing of a battery.

BRIEF DESCRIPTION OF THE DRAWINGS

The present technology may be more completely understood and appreciated in consideration of the following detailed description of various embodiments in connection with the accompanying drawings.

DETAILED DESCRIPTION

In a variety of embodiments, the present technology combines the function of a protective vent with the functionality of a 1-way relief valve. The vent allows for venting of an enclosure during normal operation conditions, but if there is a high-pressure event in the enclosure, such as an explosive release of gas or a relatively large temperature increase in a relatively short period of time, the assembly can open to allow higher unrestricted airflow to avoid overpressure in the enclosure that could otherwise cause damage to internal components of the enclosure.

Figure 1:
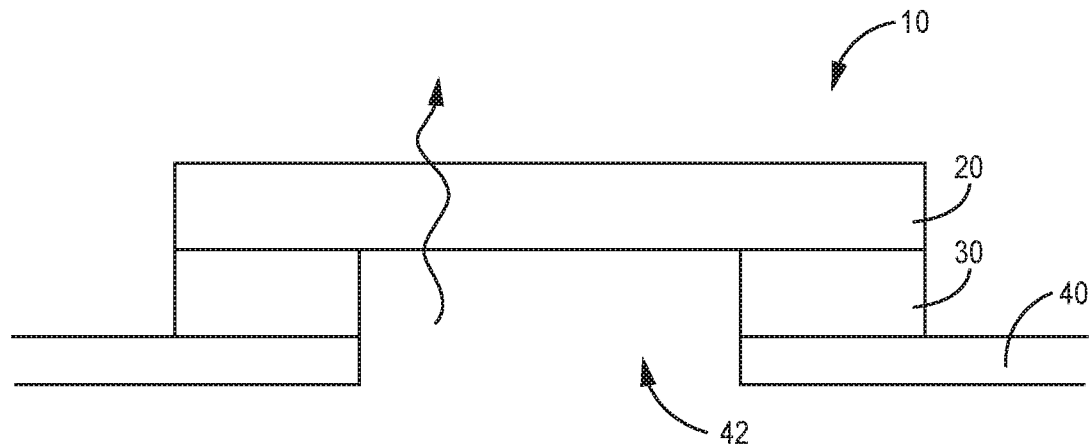
FIG. 1 is an example vent having a relief valve consistent with implementations of the technology disclosed herein.
Figure 2:
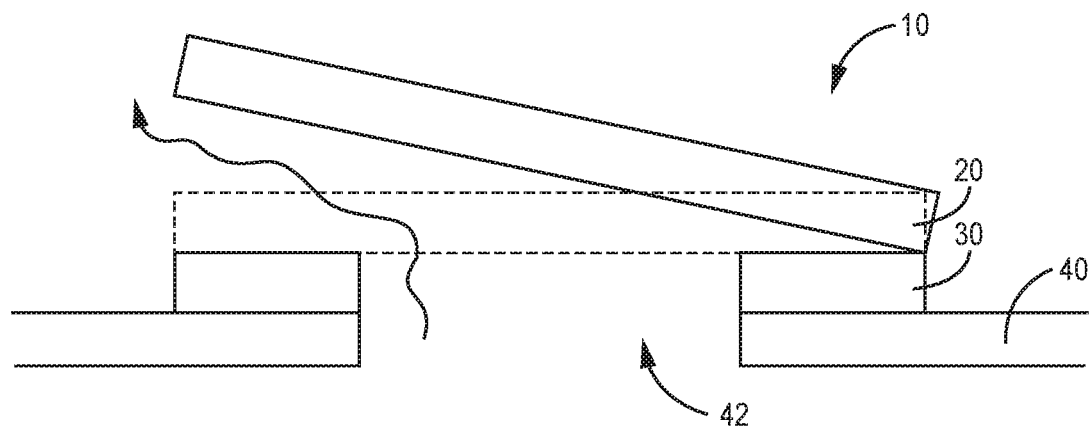
FIG. 2 is the example vent of FIG. 1.

FIG. 1 is an example assembly 10 having a vent and relief valve consistent with implementations of the technology disclosed herein. FIG. 2 is the assembly 10 of FIG. 1 in an alternate state. The assembly 10 is generally configured to couple to a casing 40 and accommodate gas flow in to and out of the casing 40 from the ambient environment under normal operation. Upon a high-pressure event inside the casing 40, the assembly 10 is configured to allow gas to escape the casing 40 relatively quickly by bypassing the assembly 10.

The assembly 10 has a vent 20 and a coupling structure 30. The vent 20 is generally positioned in fluid communication with an opening 42 in the casing 40. The vent 20 is configured to allow gases to pass into and out of the casing 40 from the environment outside of the casing 40, by flowing through vent 20. In some embodiments, the vent 20 is configured to prevent particles from entering into the casing 40. In some embodiments, the vent 20 is also configured to prevent liquids from entering into the casing 40. The vent 20 can be constructed of a variety of different materials and combinations of materials. In various embodiments the vent 20 incorporates a breathable membrane, such as polytetrafluroethylene (PTFE) or other types of breathable membranes. The vent 20 can be a laminate or composite that includes a breathable membrane, such as a PTFE laminated to a woven or non-woven support layer. In some embodiments, the vent 20 is a woven fabric or a non-woven fabric. The vent 20 can be constructed of hydrophobic material, or the vent 20 can be treated to exhibit hydrophobic properties. In one example, the vent 20 is a hydrophobic woven or non-woven fabric. In some embodiments the vent 20 has a support ring to support the periphery of the venting material.

The coupling structure 30 is configured to couple the vent 20 to the casing 40 under normal pressure conditions. When the pressure inside the casing 40 spikes above a threshold T, the coupling structure 30 releases to allow gas escaping from the casing 40 to bypass vent 20, as depicted in FIG. 2. The coupling structure 30 is generally an adhesive. The coupling structure 30 can be a pressure-sensitive adhesive. In some embodiments the coupling structure 30 is a double-sided adhesive tape.

The casing 40 is generally configured to encase components. In one example, the casing 40 is a housing for battery cells, in another example, the casing 40 is for other types of systems.

Figure 3:
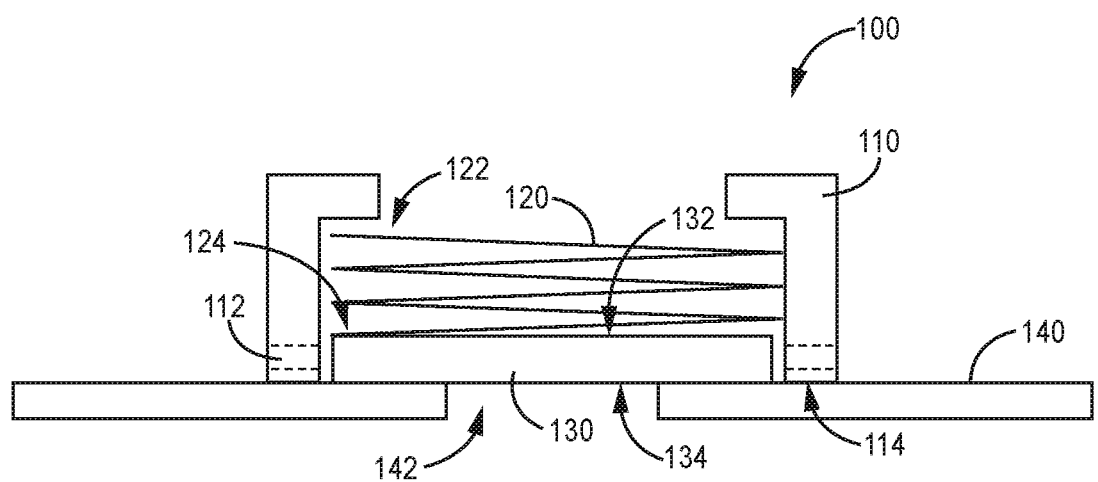
FIG. 3 is another example vent having a relief valve consistent with implementations of the technology disclosed herein.
Figure 4:
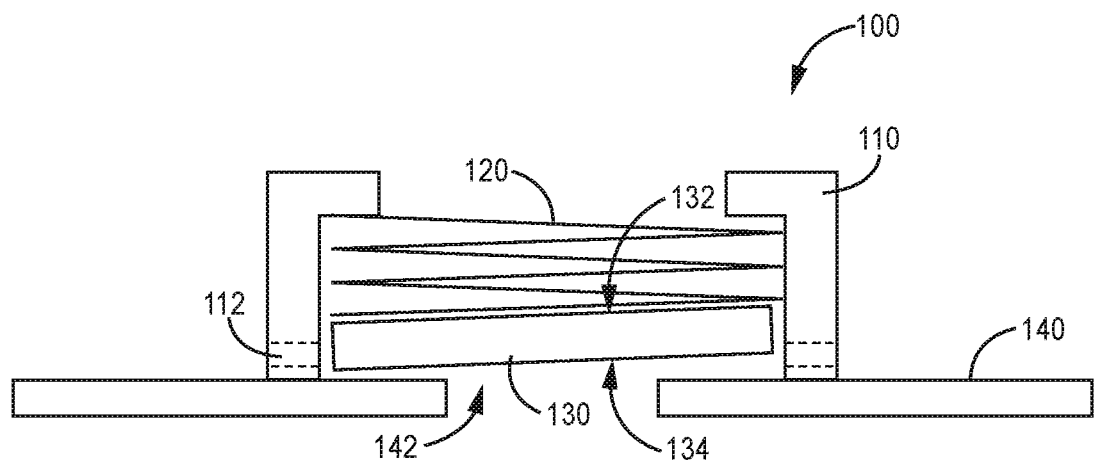
FIG. 4 is the example vent of FIG. 3.

FIG. 3 is another example vent having a relief valve consistent with implementations of the technology disclosed herein. FIG. 4 is the example vent of FIG. 3 with the relief vent in an alternate position. The assembly 100 is generally configured to couple to a casing 140 and accommodate gas flow in to and out of the casing 140 from the ambient environment under normal operation. Upon a high-pressure event inside the casing 140, the assembly 100 is configured to allow gas to escape the casing 140 relatively quickly by bypassing the assembly 100. The assembly 100 has a vent housing 110, a spring 120, and a vent 130.

The vent 130 and casing 140 are generally consistent with that described above in the discussion of FIG. 1. The vent housing 110 is generally configured to couple to the casing 140. In some embodiments the vent housing 110 has a coupling surface 114 that is configured to be coupled to the casing 140. The coupling surface 114 can be coupled to the casing 140 with an adhesive, in some embodiments. In other embodiments the coupling surface 114 can define a mating structure that is configured to mate with a corresponding structure defined by the casing 140. In some embodiments the coupling surface 114 of the vent housing 110 is welded to the casing 140. The vent housing 110 can be constructed of a variety of different materials and combinations of materials. In some embodiments the vent housing 110 is a molded plastic. In another embodiment the vent housing 110 is a metal.

The vent housing 110 is generally configured to position the vent 130 over an opening 142 defined by the casing 140. The vent housing 110 is fixed to a first end 122 of the spring 120 and the vent 130 is fixed to a second end 124 of the spring 120. The spring 120 is biased in a state of compression between the vent housing 110 and the casing 140 such that the spring 120 couples the vent 130 to the casing 140 about the opening 142 under normal pressure conditions. When the pressure inside the casing 140 spikes above a threshold T, the pressure is exerted on a second side 134 of the vent 130 against the pressure exerted on a first side 132 of the vent by the spring 120, which can translate at least a portion of the vent 130 away from the surface of the casing 140 to compress at least a portion of the spring 120. Pressurized gas from inside the casing 140 is allowed to escape the casing 140 and bypass the vent 130. In some embodiments, once the pressure inside the casing 140 returns to the threshold T or below, the spring 120 returns the vent 130 to position over the opening 142 in the casing 140.

The spring 120 can be a helical coil constructed of metal or plastic, in some embodiments. In some embodiments, the spring 120 can be a resilient material such as a foam material. The spring 120 can also be multiple coils, in some embodiments.

In some, but not all embodiments, the vent housing 110 can define an airflow pathway 112 that facilitates the passage of released gas from the casing 140 that bypasses the vent 130.

Figure 5:
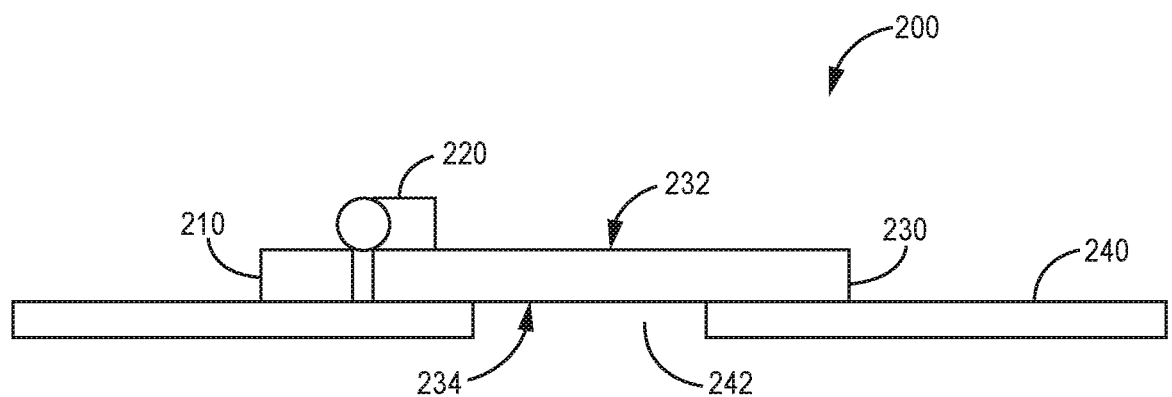
FIG. 5 is another example vent having a relief valve consistent with implementations of the technology disclosed herein.
Figure 6:
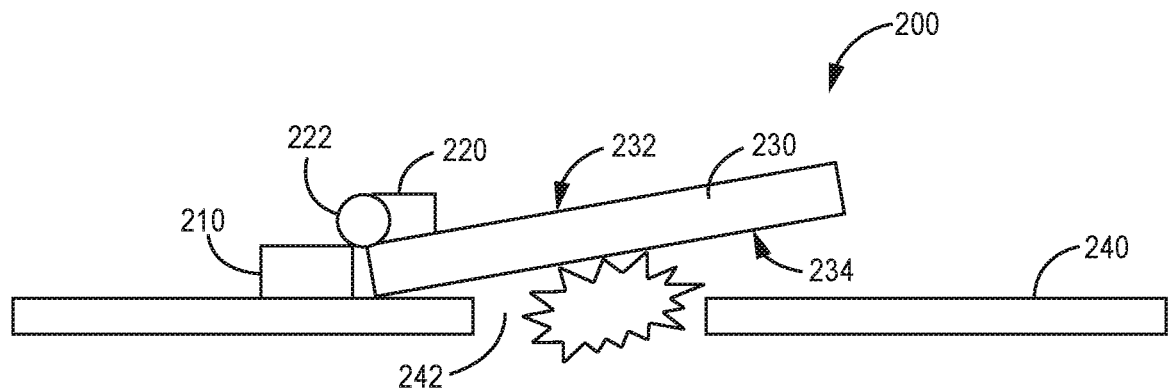
FIG. 6 is the example vent of FIG. 5.

FIG. 5 is another example vent having a relief valve consistent with implementations of the technology disclosed herein. FIG. 6 is the example vent of FIG. 5 upon a high-pressure event inside a casing 240. The assembly 200 is similar to assemblies previously described, where gas is allowed to pass between the casing 240 and the environment through a vent 230 under normal pressure conditions. Upon high pressure inside the casing 240, the assembly 200 allows gases from inside the casing 240 to bypass the vent 230.

The assembly 200 generally has a coupling structure 210, a spring 220, a hinge 222, and the vent 230. The vent 230 is positioned in fluid communication with an opening 242 defined in the casing 240. The casing 240 and the vent 230 are consistent with those already described herein above.

The coupling structure 210 is generally configured to couple the assembly 200 to the casing 240. The coupling structure 210 can be configured, for example, to receive an adhesive that couples to the casing 240. In some embodiments the coupling structure 210 defines mating features that are configured to mate with corresponding features defined by the casing 240. In some embodiments the coupling structure 210 is coupled to the casing 240 through welding. Other approaches to coupling the coupling structure 210 to the casing 240 can certainly be used, as well.

The hinge 222 couples the vent 230 to the coupling structure 210. The spring 220 pushes against a first side 232 of the vent to bias the vent 230 against the casing 240 about the opening 242 under normal pressure conditions. When pressure inside the casing 240 spikes above a threshold T, the gas in the casing 240 pushes against a second side 234 of the vent 230 against the spring 220, which translates the vent 230 away from the casing 240 and causes the spring 220 to compress. An opening is then defined between the vent 230 and the casing 240 (FIG. 6), which allows the gas inside the casing 240 to escape from the casing 240 and bypass the vent 230. The hinge defines the translation path of the vent 230, which is a pivot. In various embodiments, when the pressure inside the casing 240 returned to the threshold T or below, the spring 220 is configured to translate the vent 230 about the hinge 222 to its initial position (FIG. 5) against the casing 240 about the opening 242.

The spring 220 can be consistent with springs described above in the discussion of FIGS. 3-4. The hinge 222 can have a variety of configurations and generally defines a pivot axis of the vent 230 relative to the casing 240.

Figure 7:
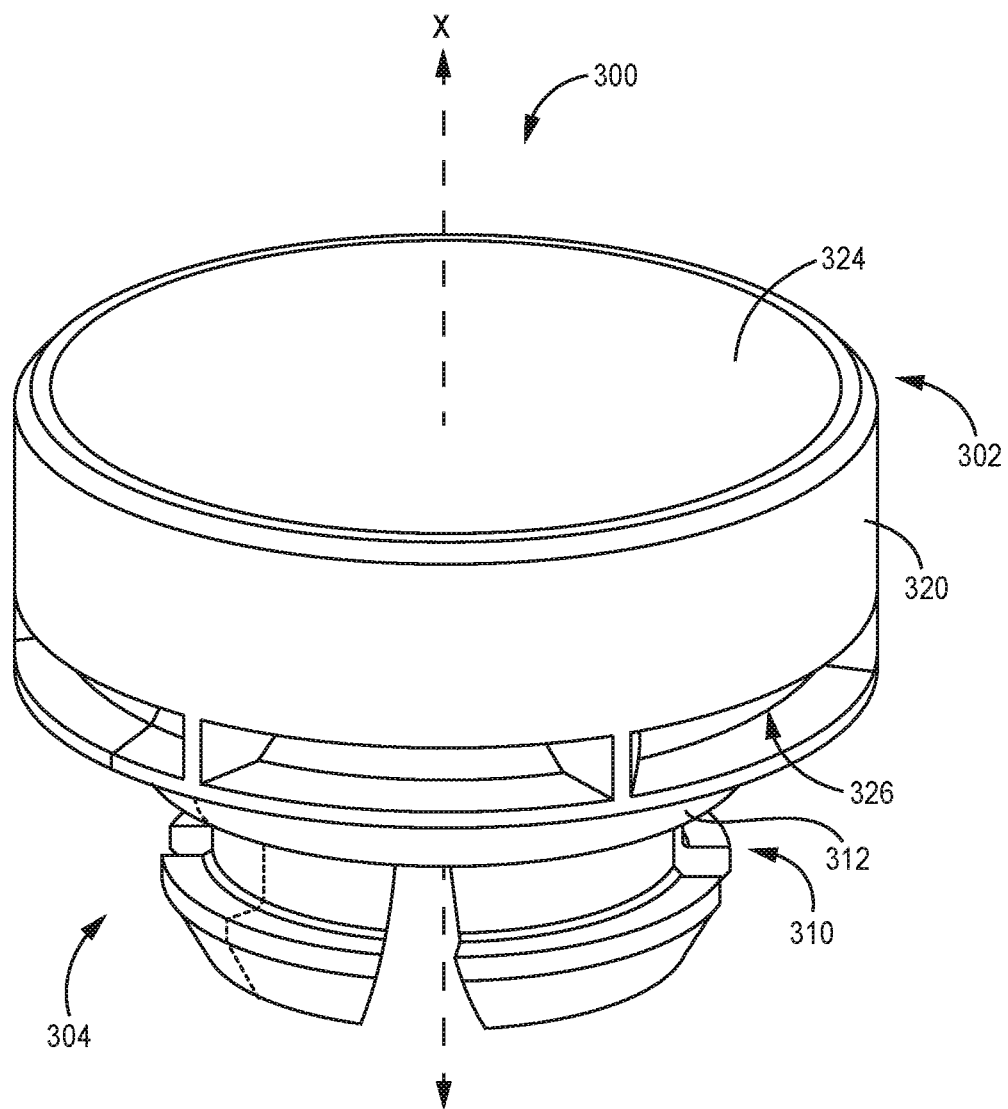
FIG. 7 is another example vent having a relief valve consistent with implementations of the technology disclosed herein.
Figure 8:
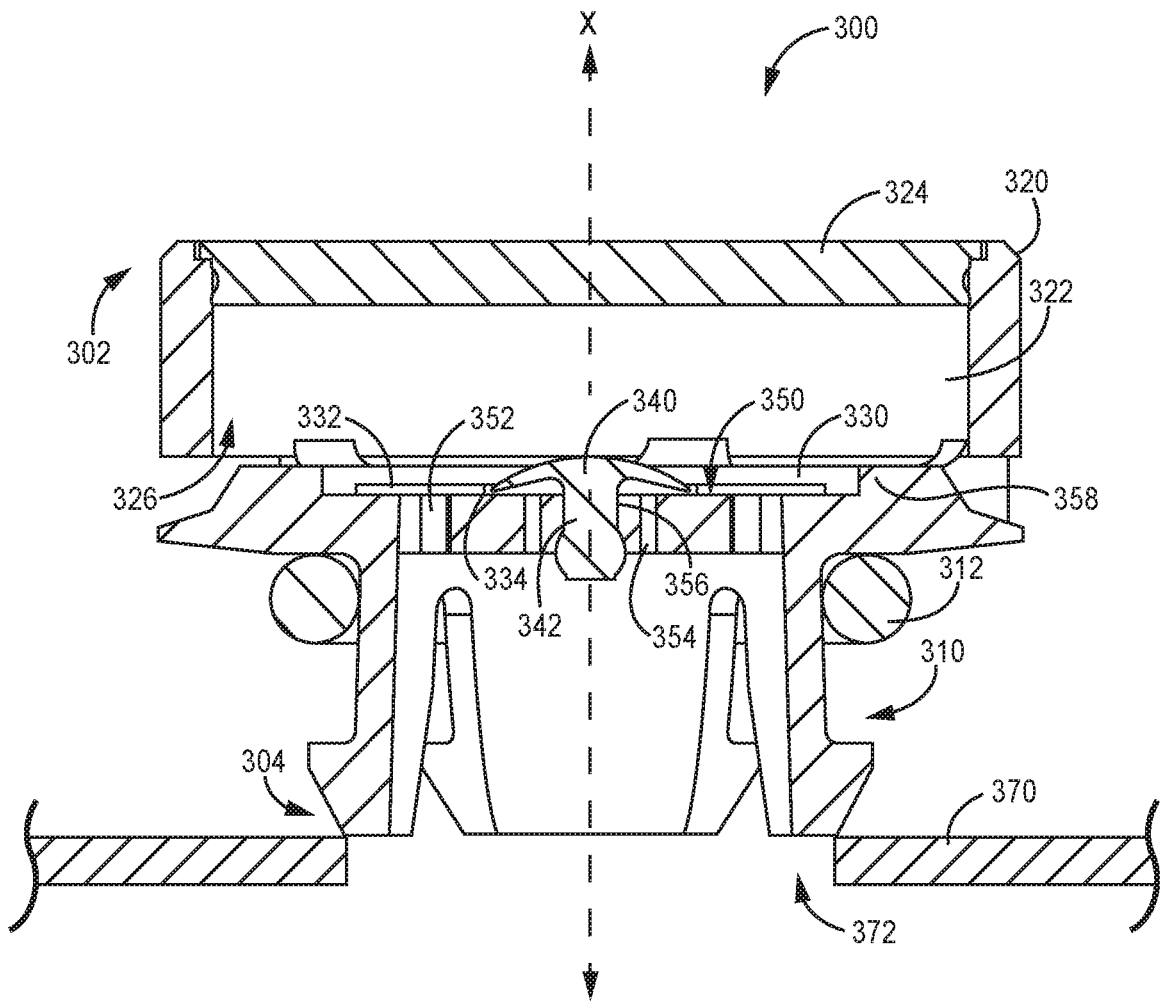
FIG. 8 is a perspective cross-sectional view of the vent of FIG. 7.
Figure 9:
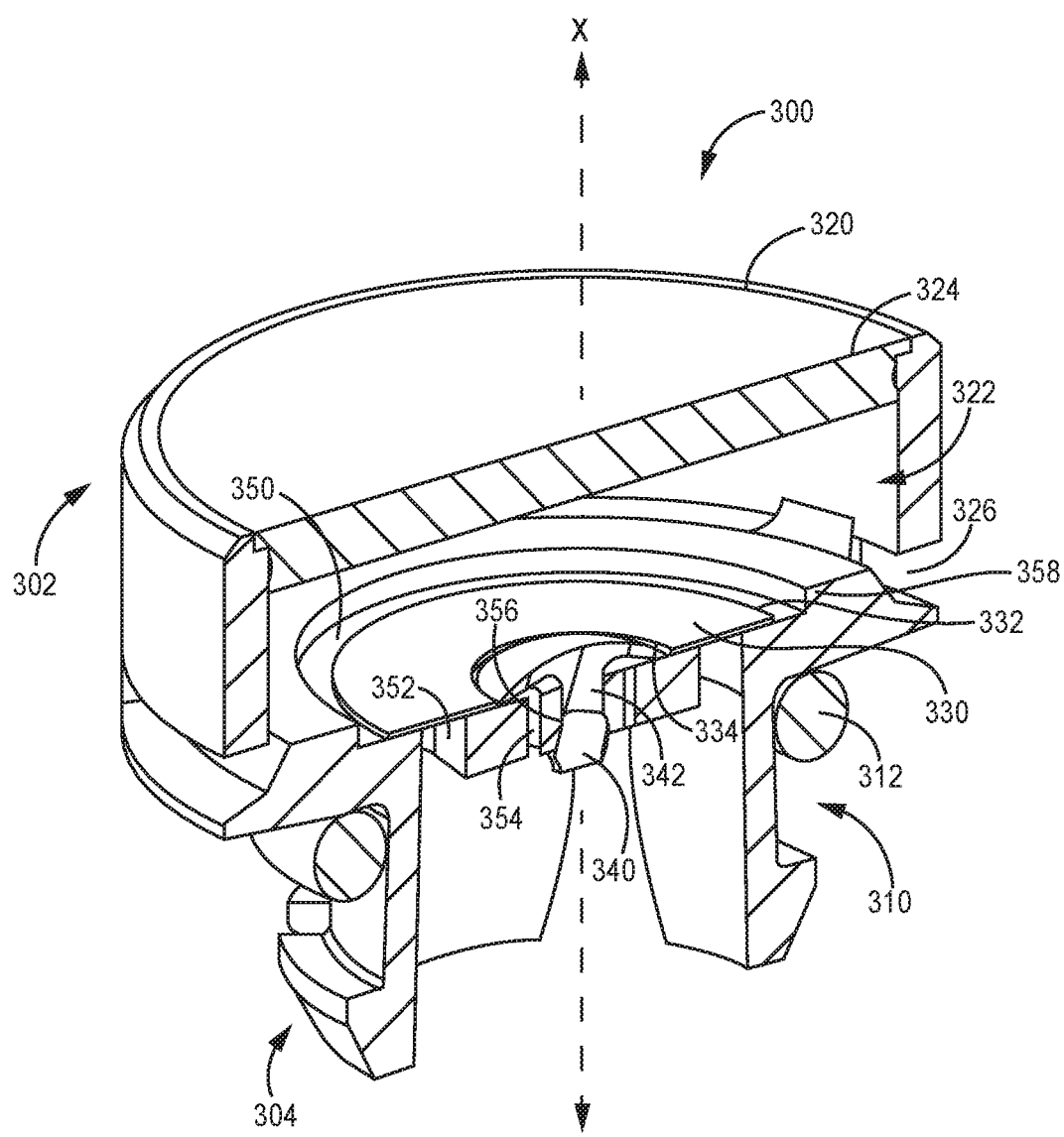
FIG. 9 is a facing view of the cross-section depicted in FIG. 8.

FIG. 7 is a perspective view of an example vent having a relief valve consistent with implementations of the technology disclosed herein. FIG. 8 is a cross-sectional view of the vent of FIG. 7 and a casing 370, and FIG. 9 is a perspective view of the cross-section of FIG. 8. Similar to assemblies previously described, the current assembly 300 is generally configured to allow gases to pass between a casing 370 and the environment through a vent 330 under normal pressure conditions. Upon a high-pressure event inside the casing 370, the assembly 300 is configured to allow gases to escape the casing 370 by bypassing the vent 330. The assembly 300 generally has a vent housing 320, a coupling structure 310 a mounting surface 350, a vent 330, and a relief valve 340.

The vent housing 320 is generally configured to house the vent 330 and the relief valve 340. The vent housing 320 defines a cavity 322, a first end 302, a second end 304, and a coupling structure 310. The vent housing 320 can be constructed of a variety of materials and combinations of materials. In some embodiments the vent housing 320 is constructed of plastic or metal. In one example, at least a portion of the vent housing 320 is an injection-molded plastic. An end cap 324 is coupled to the vent housing 320 towards the first end 302. The end cap 324 can form a unitary component with the vent housing 320 in some other embodiments. The cavity 322 is also defined by the end cap 324.

The mounting surface 350 is generally positioned between the first end 302 and the second end 304 within the cavity 322. The mounting surface 350 is generally configured to receive the vent 330 and the relief valve 340. While the mounting surface 350 can be a single planar surface, in some other embodiments the mounting surface can be defined by multiple surfaces that are not necessarily planar.

The mounting surface 350 defines a vent opening 352 and a valve opening 354. The vent opening 352 and the valve opening 354 can each be one or more openings defined by the mounting surface 350. In a variety of embodiments, the mounting surface 350 is a unitary structure with the vent housing 320. In some other embodiments, however, the mounting surface 350 is defined by a separate component that is coupled to the vent housing 320, either through a frictional fit or through the use of couplers such as screws.

The vent 330 is coupled to the mounting surface 350 across the vent opening 352. The vent 330 is generally configured to allow passive airflow between the casing 370 and the ambient environment while preventing liquids and particulates from entering into the casing 370. The vent 330 is positioned in fluid communication with the opening 372 in the casing 370. The vent 330 can be coupled to the mounting surface 350 with an adhesive. The vent 330 can be constructed of materials similar to vents described herein above. In the current example, the vent 330 forms an annulus, and the vent 330 can be coupled to the mounting surface 350 with adhesive disposed adjacent to its outer perimeter 332 and its inner perimeter 334 to form a seal between the vent 330 and the mounting surface 350.

The valve 340 is sealably disposed on the mounting surface 350 across the valve opening 354. In a variety of embodiments, the valve 340 is an umbrella valve. The valve 340 is generally configured to form a seal around the valve opening 354 to allow gases to passively vent through the vent opening 352 and vent 330 under normal pressure conditions and, upon a pressure spike within the casing 370 above a threshold T, the pressure displaces the umbrella valve 340 to unseal from the valve opening 354 and allow gas to bypass the vent 330 and exit the casing 370 through the valve opening 354. The valve 340 is configured in parallel with the vent 330 with respect to airflow between the ambient environment and the casing 370.

The relief valve 340 is generally formed of an elastomeric material. The relief valve 340 can also be other types of relief valves, but will generally be a one-way relief valve. The relief valve 340 can be any type of umbrella valve, such as a Belleville valve. In some embodiments the relief valve 340 is configured to reseal around the valve openings 354 when the pressure inside the casing 370 returns to a level at or below the pressure threshold T.

The coupling structure 310 is generally configured to couple the assembly 300 to a casing 370 (FIG. 8) about an opening 372 defined by the casing 370. The coupling structure 310 is defined towards the second end 304 of the vent housing 320. The coupling structure 310 is generally configured to engage the casing 370. In the current example, the coupling structure 310 forms a snap-fit connection with the casing 370. In some other embodiments, the coupling structure 310 forms a mating structure that is configured to mate with a corresponding structure defined by the casing 370. For example, the coupling structure 310 can define a screw thread configured to be received by the casing 370 about the opening 372. As another example, the coupling structure 310 can define a connector that interlocks with the casing 370 about the opening 372, such as a bayonet connector. In some embodiments, the coupling structure 310 can be coupled to the casing 370 about the opening 372 with an adhesive.

In embodiments consistent with the current example, a seal 312 generally abuts the coupling structure 310. The seal 312 is configured to create a seal between the assembly 300 and the casing 370 when the assembly 300 is coupled to the casing 370. The seal 312 can be an elastomeric material. In some embodiments the seal 312 is rubber or another gasketing or sealing material.

In examples consistent with the current embodiment, the vent housing 320 defines an opening 326 between the ambient environment and the cavity 322 to define a first fluid flow pathway between the outside of the vent housing 320 and the mounting surface 350 and/or the vent 330. Also, the coupling structure 310 defines a second fluid flow pathway between the outside of the vent housing 320 and the vent 330. In such embodiments, the umbrella valve 340 is configured to unseal from the mounting surface 350 when the pressure in the second fluid flow pathway is greater than the pressure in the first fluid flow pathway by at least 0.2 psi and no more than 3 psi and, in some embodiments, from 0.5 psi to 1 psi.

The vent housing 320 has an obstruction 358 positioned between the opening 326 and the vent 330. The obstruction 358 creates a tortuous path between the opening 326 and the vent 330, meaning that fluid flowing into the opening 326 cannot directly impact the vent 330. Similarly, the obstruction 358 is positioned between the opening 326 and the valve 340.

In examples consistent with the current embodiment, the vent 330 and the valve 340 are concentric. While the valve 340 is central to the vent 330, in some other embodiments the vent can be central to the valve. In examples consistent with the current embodiment, the vent housing 320 defines a central axis X extending from the first end 302 to the second end 304. The mounting surface 350 is about the central axis x. Although not completely visible in the current views, the valve opening 354 is a plurality of openings defining a segmented annulus about the central axis X. Similarly, the vent opening 352 is a plurality of openings defining a segmented annulus about the central axis X. Furthermore, the mounting surface defines a central opening 356 about the central axis X and the umbrella valve 340 has an extension portion 342 that extends through the central opening 356. The opening 326 defined by the vent housing 320 are a series of radial openings about the central axis X.

Figure 10:
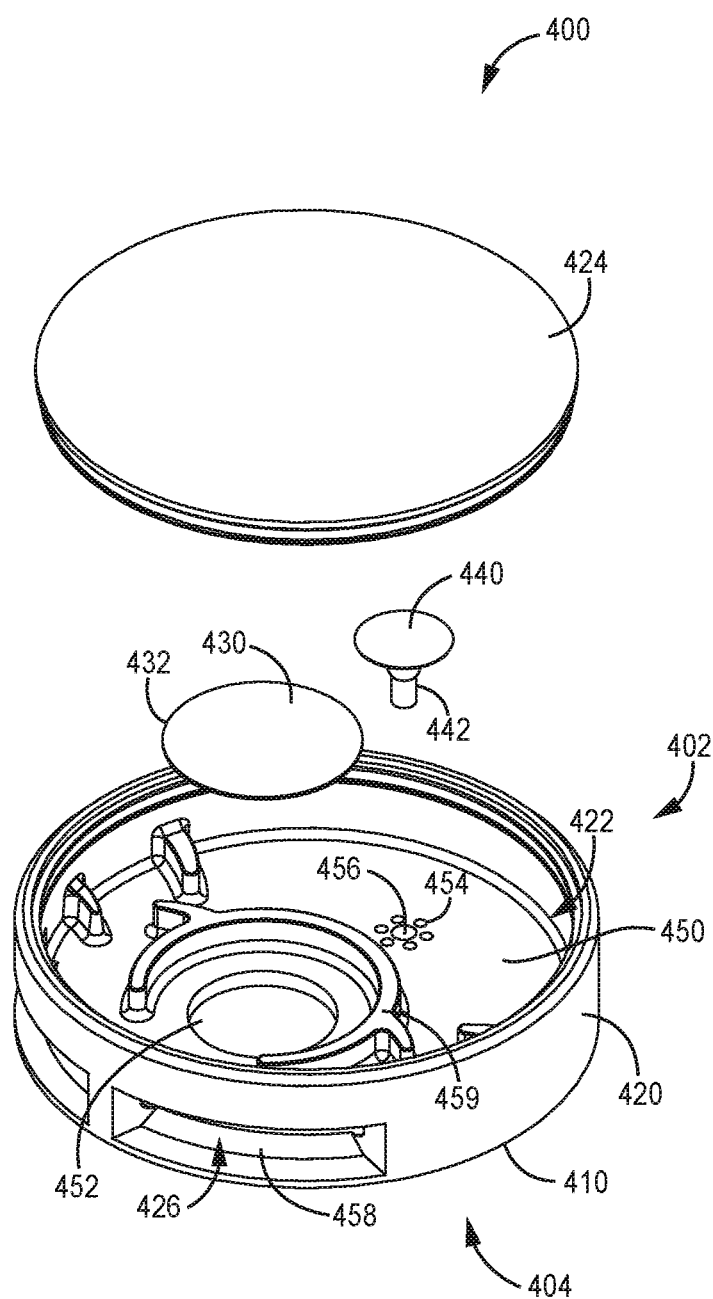
FIG. 10 is an exploded perspective view of an example vent having a relief valve consistent with some implementations of the technology disclosed herein.

FIG. 10 is an exploded view of another example assembly 400 with a vent 430 and a relief valve 440 consistent with some implementations of the technology disclosed herein. Similar to assemblies previously described, the current assembly 400 is generally configured to allow gases to pass between a casing (not currently depicted) and an outside environment through a vent 430 under normal pressure conditions. Upon a high-pressure event inside the casing, the assembly 400 is configured to allow gases to escape the casing by bypassing the vent 430. The assembly 400 generally has a vent housing 420, a mounting surface 450, a vent 430, and a relief valve 440.

The vent housing 420 is generally configured to house the vent 430 and the relief valve 440. The vent housing 420 defines a cavity 422, a first end 402, a second end 404, and a coupling structure 410. The vent housing 420 can be constructed of a variety of materials and combinations of materials, as discussed above. An end cap 424 is coupled to the vent housing 420 towards the first end 402. The end cap 424 can form a unitary component with the vent housing 420 in some other embodiments. The cavity 422 is also defined by the end cap 424.

The mounting surface 450 is generally positioned between the first end 402 and the second end 404 within the cavity 422. The mounting surface 450 is generally configured to receive the vent 430 and the relief valve 440. The mounting surface 450 defines a vent opening 452 and a valve opening 454. The vent opening 452 and the valve opening 454 can each be one or more openings defined by the mounting surface 450. The mounting surface 450 can be configured as discussed herein above. In the current example, the vent opening 452 is a single circular opening, and the valve opening 454 is a series of circular openings surrounding a valve extension opening 456 that is central to the valve openings.

The vent 430 is coupled to the mounting surface 450 across the vent opening 452. The vent 430 is generally configured to allow passive airflow between the casing and the ambient environment while preventing liquids and particulates from entering into the casing. The vent 430 is positioned in fluid communication with the opening in the casing. The vent 430 can be coupled to the mounting surface 450 with an adhesive. The vent 430 can be constructed of materials similar to vents described herein above. In the current example, the vent 430 is circular, and the vent 430 can be coupled to the mounting surface 450 with adhesive disposed adjacent to its outer perimeter 432 to form a seal between the vent 430 and the mounting surface 450.

The valve 440 is sealably disposed on the mounting surface 450 across the valve openings 454. In a variety of embodiments, the valve 440 is an umbrella valve. The valve 440 has an extension portion 442 that is received by the central valve extension opening 456. The valve 440 is generally configured to form a seal around the valve opening 454 to allow gases to passively vent through the vent opening 452 and vent 430 under normal pressure conditions and, upon a pressure spike within the casing above a threshold T, the pressure displaces the umbrella valve 440 to unseal from the valve opening 454 and allow gas to bypass the vent 430 and exit the casing through the valve opening 454. The valve 440 is configured in parallel with the vent 430 with respect to airflow between the ambient environment and the casing.

The relief valve 440 is generally formed of an elastomeric material. The relief valve 440 can also be other types of relief valves, but will generally be a one-way relief valve. The relief valve 440 can be any type of umbrella valve, such as a Belleville valve. In some embodiments the relief valve 440 is configured to reseal around the valve openings 454 when the pressure inside the casing returns to a level at or below the pressure threshold T.

The coupling structure 410 is generally configured to couple the assembly 400 to a casing about an opening defined by the casing. The coupling structure 410 is defined towards the second end 404 of the vent housing 420. The coupling structure 410 is generally configured to engage the casing. In the current example, the coupling structure 410 is a bottom (relative to the figure) surface that can be coupled to the casing about the opening with an adhesive. Alternate types of coupling structures 410 can also be used, as described above.

In examples consistent with the current embodiment, the vent housing 420 defines an opening 426 between the ambient environment and the cavity 422 to define a first fluid flow pathway between the outside of the vent housing 420 and the mounting surface 450 and/or the vent 430. Also, the coupling structure 410 defines a second fluid flow pathway between the outside of the vent housing 420 and the vent 430. In such embodiments, the umbrella valve 440 is configured to unseal from the mounting surface 450 when the pressure in the second fluid flow pathway is greater than the pressure in the first fluid flow pathway by at least 0.2 psi and no more than 2 psi and, in some embodiments, from 0.5 psi to 1 psi.

The vent housing 420 has an obstruction 458 positioned between the opening 426 and the vent 430. The first obstruction 458 creates a tortuous path between the opening 426 and the vent 430, meaning that fluid flowing into the opening 426 cannot directly impact the vent 430. Similarly, one or more second obstructions 459 are positioned between the opening(s) 426 and the valve 440. The second obstruction(s) 459 creates a tortuous path between the opening 426 and the valve, meaning that fluid flowing into the opening 426 cannot directly impact the valve 440.

Figure 11:
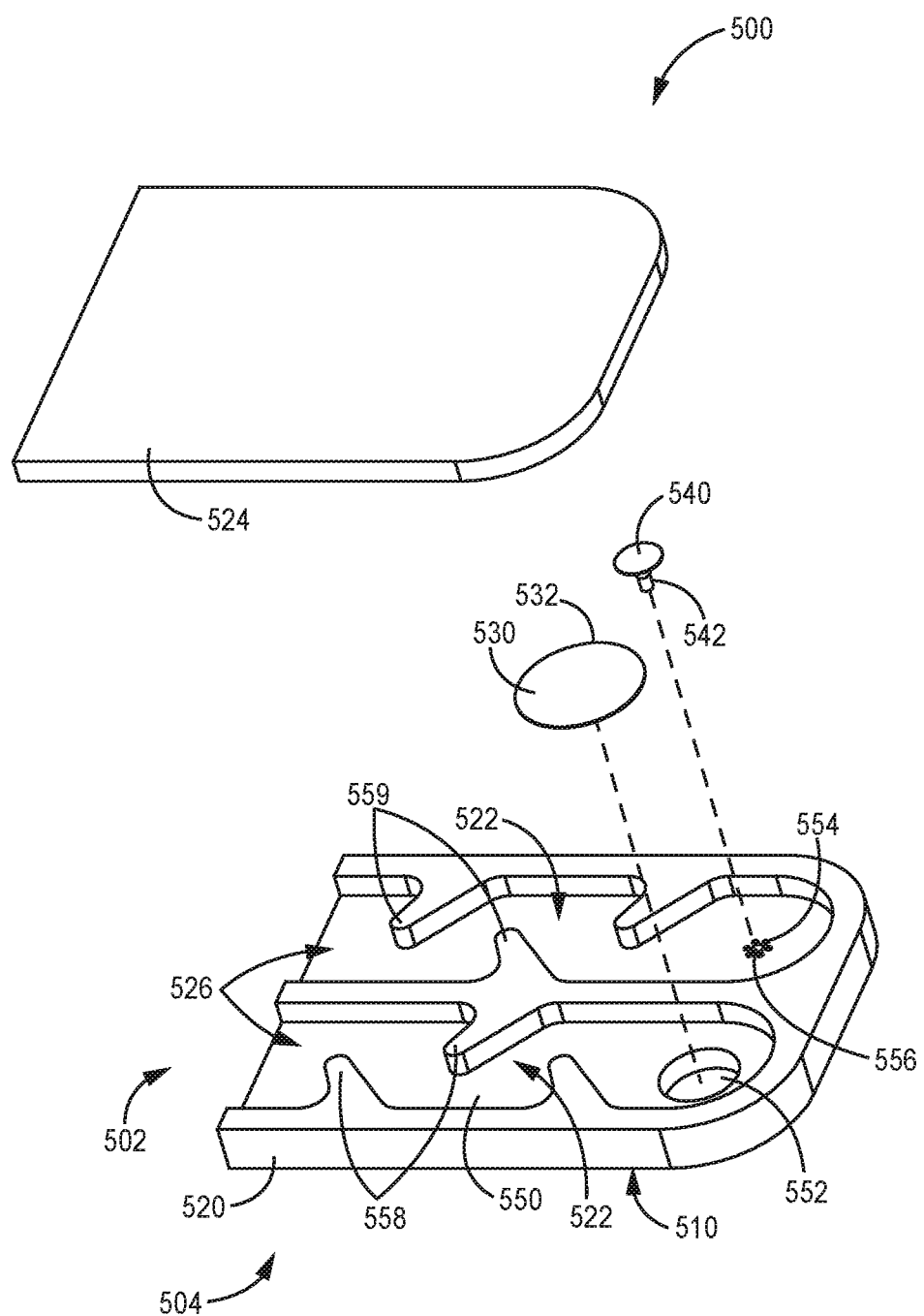
FIG. 11 is an exploded perspective view of yet another example vent having a relief valve consistent with some implementations of the technology disclosed herein.

FIG. 11 is an exploded view of another example assembly 500 with a vent 530 and a relief valve 540 consistent with some implementations of the technology disclosed herein. Similar to assemblies previously described, the current assembly 500 is generally configured to allow gases to pass between a casing (not currently depicted) and an outside environment through a vent 530 under normal pressure conditions. Upon a high-pressure event inside the casing, the assembly 500 is configured to allow gases to escape the casing by bypassing the vent 530. The assembly 500 generally has a vent housing 520, a mounting surface 550, a vent 530, and a relief valve 540.

The vent housing 520 is generally configured to house the vent 530 and the relief valve 540. The vent housing 520 defines a cavity 522, a first end 502, a second end 504, and a coupling structure 510. The vent housing 520 can be constructed of a variety of materials and combinations of materials, as discussed above. An end cap 524 is coupled to the vent housing 520 towards the first end 502. The end cap 524 can form a unitary component with the vent housing 520 in some other embodiments. The cavity 522 is also defined by the end cap 524.

The mounting surface 550 is generally positioned between the first end 502 and the second end 504 within the cavity 522. The mounting surface 550 is generally configured to receive the vent 530 and the relief valve 540. The mounting surface 550 defines a vent opening 552 and a valve opening 554. The vent opening 552 and the valve opening 554 can each be one or more openings defined by the mounting surface 550. The mounting surface 550 can be configured as discussed herein above, and in the current example the mounting surface 550 has two surfaces. In the current example, the vent opening 552 is a single circular opening, and the valve opening 554 is a series of circular openings surrounding a valve extension opening 556 that is central to the valve openings 554.

The vent 530 is coupled to the mounting surface 550 across the vent opening 552. The vent 530 is generally configured to allow passive airflow between the casing and the ambient environment while preventing liquids and particulates from entering into the casing. The vent 530 is positioned in fluid communication with the opening in the casing. The vent 530 can be coupled to the mounting surface 550 with an adhesive. The vent 530 can be constructed of materials similar to vents described herein above. In the current example, the vent 530 is circular, and the vent 530 can be coupled to the mounting surface 550 with adhesive disposed adjacent to its outer perimeter 532 to form a seal between the vent 530 and the mounting surface 550.

The valve 540 is sealably disposed on the mounting surface 550 across the valve openings 554. In a variety of embodiments, the valve 540 is an umbrella valve. The valve 540 has an extension portion 542 that is received by the central valve extension opening 556. The valve 540 is generally configured to form a seal around the valve opening 554 to allow gases to passively vent through the vent opening 552 and vent 530 under normal pressure conditions and, upon a pressure spike within the casing above a threshold T, the pressure displaces the umbrella valve 540 to unseal from the valve opening 554 and allow gas to bypass the vent 530 and exit the casing through the valve opening 554. The valve 540 is configured in parallel with the vent 530 with respect to airflow between the ambient environment and the casing.

The relief valve 540 is generally formed of an elastomeric material. The relief valve 540 can also be other types of relief valves, but will generally be a one-way relief valve. The relief valve 540 can be any type of umbrella valve, such as a Belleville valve. In some embodiments the relief valve 540 is configured to reseal around the valve openings 554 when the pressure inside the casing returns to a level at or below the pressure threshold T.

The coupling structure 510 is generally configured to couple the assembly 500 to a casing about an opening defined by the casing. The coupling structure 510 is defined towards the second end 504 of the vent housing 520. The coupling structure 510 is generally configured to engage the casing. In the current example, the coupling structure 510 is the bottom (relative to the figure) surface that can be coupled to a casing about an opening with an adhesive. Alternate types of coupling structures 510 can also be used, as described above.

It is noted that, in embodiments consistent with the current example, the cavity 522 is actually two separate cavities, one that houses the valve 540, and the other than houses the vent 530. In some embodiments there is a single cavity. In examples consistent with the current embodiment, the vent housing 520 defines an opening 526 between the ambient environment and the cavity 522 to define a first fluid flow pathway between the outside of the vent housing 520 and the mounting surface 550 and/or the vent 530. Also, the coupling structure 510 defines a second fluid flow pathway between the outside of the vent housing 520 and the vent 530. In such embodiments, the umbrella valve 540 is configured to unseal from the mounting surface 550 when the pressure in the second fluid flow pathway is greater than the pressure in the first fluid flow pathway by at least 0.2 psi and no more than 2 psi and, in some embodiments, from 0.5 psi to 1 psi.

The vent housing 520 has an obstruction 558 positioned between the opening 526 and the vent 530. The first obstruction 558 creates a tortuous path between the opening 526 and the vent 530, meaning that fluid flowing into the opening 526 cannot directly impact the vent 530. Similarly, one or more second obstructions 559 are positioned between the opening(s) 526 and the valve 540. The second obstruction(s) 559 creates a tortuous path between the opening 526 and the valve, meaning that fluid flowing into the opening 526 cannot directly impact the valve 540.

It should also be noted that, as used in this specification and the appended claims, the phrase "configured" describes a system, apparatus, or other structure that is constructed or configured to perform a particular task or adopt a particular configuration. The phrase "configured" can be used interchangeably with other similar phrases such as "arranged", "arranged and configured", "constructed and arranged", "constructed", "manufactured and arranged", and the like.

All publications and patent applications in this specification are indicative of the level of ordinary skill in the art to which this technology pertains. All publications and patent applications are herein incorporated by reference to the same extent as if each individual publication or patent application was specifically and individually indicated by reference.

This application is intended to cover adaptations or variations of the present subject matter. It is to be understood that the above description is intended to be illustrative, and not restrictive.

What is claimed is:

1. A vent assembly comprising: a housing defining a cavity, a first end, a second end, and a coupling structure towards the second end; a mounting surface positioned between the first end and the second end within the cavity, the mounting surface defining a valve opening and a vent opening; a passive airflow vent disposed across the vent opening; and an umbrella valve sealably disposed on the mounting surface across the valve opening, wherein the umbrella valve is arranged in parallel with the passive airflow vent with respect to airflow through the housing wherein the housing further defines a central axis extendin from the first end to the second end, and wherein the mounting surface is about the central axis; wherein the housing defines radial openings about the central axis, wherein the radial openings define a fluid flow pathway between the outside of the housing and the passive airflow vent; wherein the passive airflow vent and the umbrella valve are concentric.

2. The vent assembly of claim 1, further comprising an end cap coupled to the housing towards the first end.

3. The vent assembly of claim 1, wherein the mounting surface forms a unitary structure with the housing.

4. The vent assembly of claim 1, wherein the passive airflow vent comprises a breathable membrane.

5. The vent assembly of claim 1, wherein the housing defines an opening between an ambient environment and the cavity to define a fluid flow pathway between the outside of the housing and the mounting surface.

6. The vent assembly of claim 5 the housing comprising a first obstruction, wherein the first obstruction is positioned between the opening and the passive airflow vent.

7. The vent assembly of claim 5, the housing comprising a second obstruction disposed on the mounting surface extending into the fluid flow pathway, wherein the second obstruction is positioned between the opening and the umbrella valve.

8. The vent assembly of claim 5, wherein the fluid flow pathway defines a tortuous path between the opening and the umbrella valve.

9. The vent assembly of claim 1, the coupling structure defining a fluid flow pathway between the outside of the housing and the passive airflow vent.

10. The vent assembly of claim 1, wherein the housing defines a first fluid flow pathway between the outside of the housing and the passive airflow vent, the coupling structure defines a second fluid flow pathway between the outside of the housing and the passive airflow vent, and the umbrella valve is configured to unseal from the mounting surface when the pressure in the second fluid flow pathway is greater than the pressure in the first fluid flow pathway by 0.5 to 1 psi.

11. The vent assembly of claim 1, wherein the valve opening comprises a plurality of openings defining a segmented annulus about the central axis.

12. The vent assembly of claim 1, wherein the vent opening is a plurality of openings defining a segmented annulus about the central axis.

13. The vent assembly of claim 1, wherein the mounting surface defines a central opening about the central axis and the umbrella valve comprises an extension portion that extends through the central opening.

14. The vent assembly of claim 1, further comprising a seal abutting the coupling structure.

\* \* \* \* \*

UNITED STATES PATENT AND TRADEMARK OFFICE
CERTIFICATE OF CORRECTION

PATENT NO.         : 11,047,508 B2
APPLICATION NO.    : 16/497596
DATED              : June 29, 2021
INVENTOR(S)        : Jacob Sanders et al.

Page 1 of 1

It is certified that error appears in the above-identified patent and that said Letters Patent is hereby corrected as shown below:

In the Claims

Claim 1, Column 10, Line 17, 'extendin' should be --extending--

Signed and Sealed this
Thirty-first Day of August, 2021

Drew Hirshfeld
*Performing the Functions and Duties of the*
*Under Secretary of Commerce for Intellectual Property and*
*Director of the United States Patent and Trademark Office*